US009469269B2

(12) United States Patent
Hiruta et al.

(10) Patent No.: US 9,469,269 B2
(45) Date of Patent: Oct. 18, 2016

(54) PASSENGER RETAINING APPARATUS

(71) Applicants: Teruhiko Hiruta, Tokyo (JP); Hiroo Kawaguchi, Tokyo (JP); Makoto Ogawa, Tokyo (JP); Yoshitake Kitaguchi, Tokyo (JP); Toshiro Koyanagi, Tokyo (JP)

(72) Inventors: Teruhiko Hiruta, Tokyo (JP); Hiroo Kawaguchi, Tokyo (JP); Makoto Ogawa, Tokyo (JP); Yoshitake Kitaguchi, Tokyo (JP); Toshiro Koyanagi, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 14/806,298

(22) Filed: Jul. 22, 2015

(65) Prior Publication Data

US 2016/0023626 A1 Jan. 28, 2016

(30) Foreign Application Priority Data

Jul. 23, 2014 (JP) .................................. 2014-149894
Nov. 27, 2014 (JP) .................................. 2014-240098

(51) Int. Cl.
| *B60R 21/203* | (2006.01) |
| *B60R 21/213* | (2011.01) |
| *B60R 21/232* | (2011.01) |
| *B60R 21/2338* | (2011.01) |
| *B60R 21/231* | (2011.01) |

(52) U.S. Cl.
CPC ............ *B60R 21/232* (2013.01); *B60R 21/231* (2013.01); *B60R 21/2338* (2013.01); *B60R 2021/23107* (2013.01)

(58) Field of Classification Search
CPC .......... B60R 21/213; B60R 21/23138; B60R 21/232; B60R 21/2338; B60R 21/203; B60R 2021/0009; B60R 2021/0023; B60R 2021/0048; B60R 2021/23107; B60R 2021/23316; B60R 2021/23382; B60R 2021/23386

See application file for complete search history.

(56) References Cited

U.S. PATENT DOCUMENTS 7,784,823 B2 *   8/2010   Heigl ................... B60R 21/213
                                                          280/730.2
8,636,301 B1   1/2014   Wang et al.
(Continued)

FOREIGN PATENT DOCUMENTS

JP      2014-37159 A      2/2014
WO   2012/111073 A1    8/2012

*Primary Examiner* — Laura Freedman
(74) *Attorney, Agent, or Firm* — Fitch Even Tabin & Flannery LLP

(57) ABSTRACT

A passenger retaining apparatus includes a driver seat airbag and a curtain airbag. The curtain airbag includes first and second inflation portions and a recess portion. The first inflation portion is inflated at a passenger side with respect to the inflated driver seat airbag in a vehicle body longitudinal direction. The second inflation portion is inflated at a wind shield side with respect to the inflated driver seat airbag in the vehicle body longitudinal direction. The recess portion is formed between the first and second inflation portions to engage with the inflated driver seat airbag. The driver seat airbag retains a front surface of a head of the passenger and the first inflation portion retains a side surface of the head of the passenger.

7 Claims, 16 Drawing Sheets

(56) References Cited

U.S. PATENT DOCUMENTS

| | | | |
|---|---|---|---|
| 8,764,053 B1* | 7/2014 | Dix | B60R 21/203 280/729 |
| 8,876,153 B2* | 11/2014 | Dix | B60R 21/233 280/729 |
| 8,894,094 B2* | 11/2014 | Wang | B60R 21/232 280/730.2 |
| 8,899,617 B2* | 12/2014 | Fukawatase | B60R 21/232 280/730.2 |
| 8,967,660 B2* | 3/2015 | Taguchi | B60R 21/233 280/729 |
| 8,998,250 B2* | 4/2015 | Kruse | B60R 21/232 280/729 |
| 9,108,588 B2* | 8/2015 | Fukawatase | B60R 21/233 |
| 9,114,776 B2* | 8/2015 | Thomas | B60R 21/2338 |
| 9,114,777 B2* | 8/2015 | Fukawatase | B60R 21/232 |
| 9,180,834 B1* | 11/2015 | Le | B60R 21/231 |
| 9,266,494 B2* | 2/2016 | Wang | B60R 21/237 |
| 2014/0203541 A1* | 7/2014 | Wei | B60R 21/213 280/730.2 |
| 2014/0361521 A1* | 12/2014 | Fukawatase | B60R 21/231 280/730.1 |
| 2015/0115581 A1* | 4/2015 | Mazanek | B60R 21/232 280/730.2 |
| 2016/0039385 A1* | 2/2016 | Watamori | B60R 21/23138 280/730.1 |

* cited by examiner

→ VEHICLE FRONT SIDE

PASSENGER RETAINING APPARATUS

CROSS-REFERENCE TO RELATED APPLICATIONS

This application claims the benefit of Japanese Patent Application Nos. 2014-149894, filed on Jul. 23, 2014 and 2014-240098, filed on Nov. 27, 2014, the entire contents of which are hereby incorporated by reference, the same as if set forth at length, the entire of which are incorporated herein by reference.

TECHNICAL FIELD

The present invention relates to a passenger retaining apparatus for retaining a passenger upon crash of a vehicle. Specifically, the present invention relates to a passenger retaining apparatus having a driver seat airbag and a curtain airbag.

BACKGROUND ART

In vehicles, various airbag devices are mounted, for example a drier seat airbag device and a curtain airbag device. In FIG. 2 and paragraphs 0048 to 0051 of Patent Document 1, a technique is disclosed in which, upon a slight lap crash, a driver seat airbag and a curtain airbag are inflated and also a sub-chamber provided in the curtain airbag is inflated to receive a head of a passenger rushed into a gap between the curtain airbag and the driver seat airbag.

In FIG. 8 and paragraphs 0061 to 0067 of Patent Document 2, a technique is disclosed in which, upon a slight lap crash, a driver seat airbag is first inflated and then a second airbag portion provided in a curtain airbag is inflated more toward a passenger relative to the driver seat airbag, thereby receiving a head of the passenger (driver).

In FIG. 9 and paragraphs 0080 to 0084 of Patent Document 2, a technique is disclosed in which the second airbag portion of the curtain airbag is inflated to be packed between a first airbag portion of the curtain airbag and the driver seat airbag, thereby receiving the head of the driver.

[Patent Document 1] JP-A-2014-37159
[Patent Document 2] WO 2012/111073

SUMMARY OF INVENTION

Technical Issue

Patent Document 2 describes techniques of retaining a passenger obliquely moved upon a slight lap crash. However, if further attempting to retain the passenger by associating the driver seat airbag with the curtain airbag, there is a case where a structure of each airbag is complicated. The present invention has been made keeping in mind the above issue, and an object thereof is to provide a passenger retaining apparatus in which retaining of a passenger can be performed only by providing unevenness on a curtain airbag without changing a shape of a conventional driver airbag.

Solution to Issue

A passenger retaining apparatus includes a driver seat airbag and a curtain airbag. The curtain airbag expands toward a side of a passenger. The curtain airbag includes first and second inflation portions and a recess portion. The first inflation portion is inflated at a passenger side with respect to the inflated driver seat airbag in a vehicle body longitudinal direction. The second inflation portion is inflated at a wind shield side with respect to the inflated driver seat airbag in the vehicle body longitudinal direction. The recess portion is formed between the first and second inflation portions and is configured to engage with the inflated driver seat airbag. Upon a slight lap crash or an oblique crash of a vehicle, the driver seat airbag retains a front surface of a head of the passenger and the first inflation portion retains a side surface of the head of the passenger.

It is preferable that a distance between a most passenger-side surface of the first inflation portion of the inflated curtain airbag and a center axis of a steering shaft is within a range of 80 mm to 230 mm, in a vehicle body width direction.

It is preferable that a distance between a most door-side end portion of the inflated driver seat airbag and a most passenger-side surface of the second inflation portion of the inflated curtain airbag is within a range of 25 mm to 150 mm, in a vehicle body width direction.

The curtain airbag of the present invention may include a shallowing unit. The shallowing unit shallows a depth of the recess portion after starting inflations of the first inflation portion and the second inflation portion.

The shallowing unit may be an inflation portion which is configured to be inflated in a vehicle interior side of the recess portion. The inflation portion may be formed on a vehicle interior side of a main body portion of the curtain airbag by being fold at a lower side of the main body portion of the curtain airbag. The inflation portion may include a hole, a small panel and a seam. The hole is formed on a panel of a vehicle interior side of the curtain airbag. The small panel covers the hole. The seam sews a peripheral edge of the small panel to the panel of the vehicle interior side of the curtain airbag.

The shallowing unit may include a tether, a front seam and a rear seam. The tether extends in the vehicle body longitudinal direction on a vehicle exterior side of the curtain airbag across a forming region of the recess portion. The front seam sews a front end portion of the tether to a panel of the curtain airbag. The rear seam sews a rear end portion of the tether to the panel of the curtain airbag. A length of the tether between the front seam and the rear seam is smaller than a length of the panel of the curtain airbag between the front seam and the rear seam.

Advantageous Effects of Invention

According to the passenger retaining apparatus of the present invention, the driver seat airbag and the curtain airbag are inflated upon a slight lap crash or oblique crash of a vehicle. Then, the first inflation portion provided in the curtain airbag is inflated at the passenger side of the driver seat airbag, the second inflation portion is inflated at the wind shield side of the driver seat airbag, and the driver seat airbag is engaged between the first inflation portion and the second inflation portion.

The driver seat airbag is supported (backup) by a steering wheel and the second inflation portion.

Upon a slight lap crash or oblique crash of a vehicle, a front surface of a head of a passenger sat on a driver seat is retained by the driver seat airbag, and at substantially the same time, a side surface of the head is retained by the first inflation portion of the curtain airbag.

The curtain airbag further includes a shallowing unit delayedly inflated relative to inflation of the first inflation portion and the second inflation portion for shallowing a depth of the recess portion. Thus, a configuration can be simply realized so as to prevent the head of the passenger from entering a gap between the curtain airbag and the drive seat airbag.

DESCRIPTION OF EMBODIMENTS

Now, a first embodiment will be described with reference to FIGS. 1 to 3.

Figure 1:
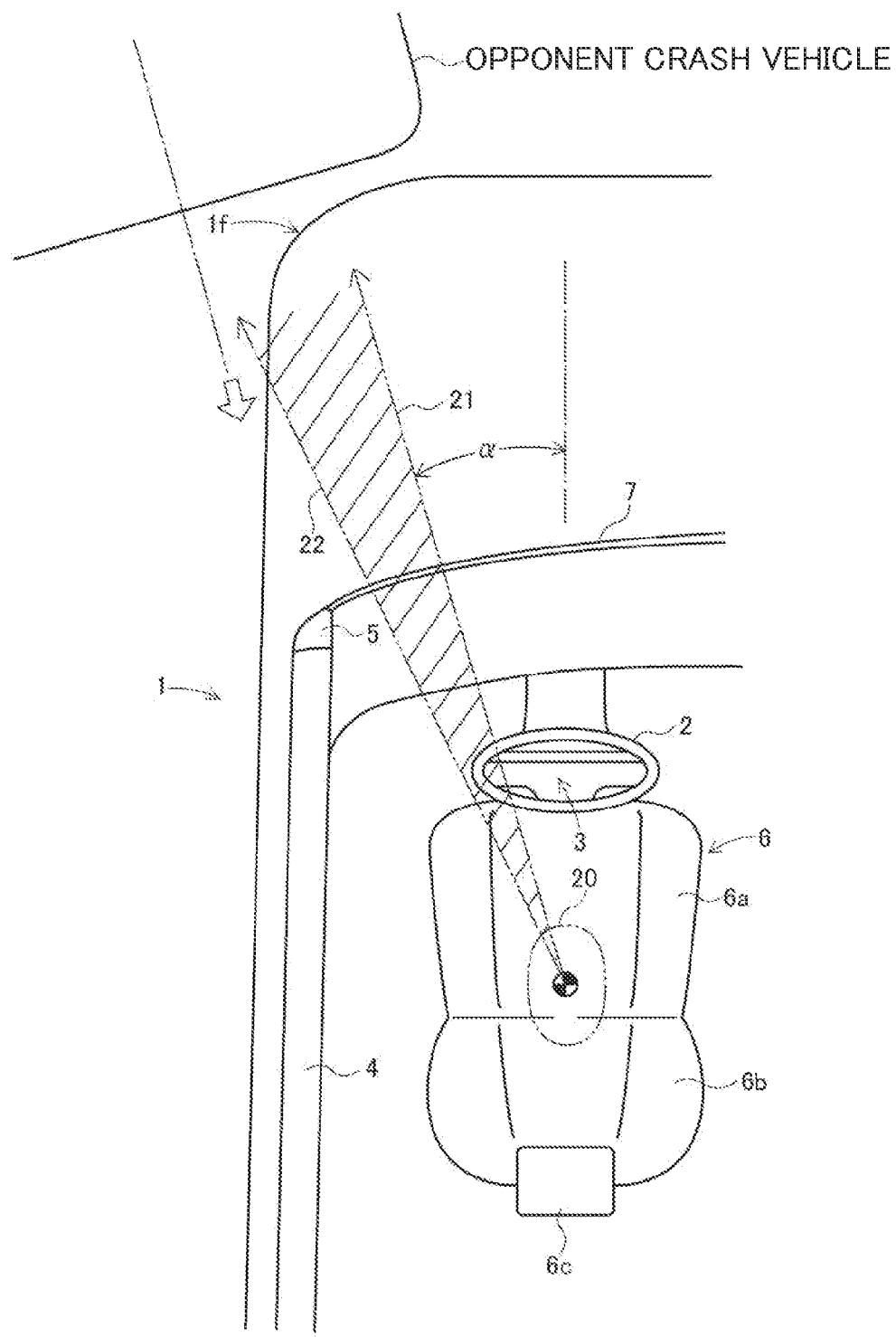
FIG. 1 is a top view showing the vicinity of a driver seat of a vehicle having a passenger retaining apparatus according to an embodiment.
Figure 2:
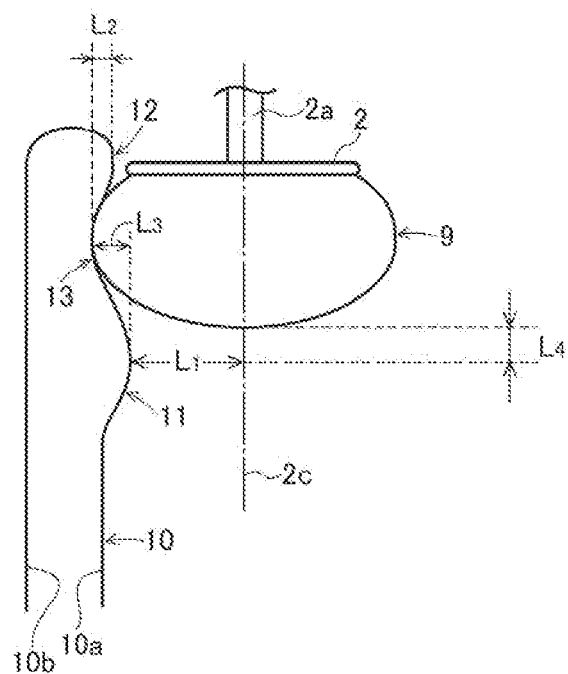
FIG. 2 is a schematic top view showing airbags of the passenger retaining apparatus according to the embodiment during inflation thereof.

As in FIG. 1, a driver seat airbag device 3 is installed in a steering wheel 2 of a vehicle 1.

A curtain airbag device is installed along a roof side rail 4 of the vehicle 1. The curtain airbag device may extend to an A-pillar 5.

In the vehicle 1, a driver seat 6 having a seat cushion 6a, a seat back 6b and a headrest 6c is installed. A reference numeral 7 designates a wind shield and a reference numeral 1f designates a left front end of a vehicle body.

The driver seat airbag device 3 includes a folded driver seat airbag 9, a retainer, on which the airbag 9 is attached, a module cover for covering the airbag 9, an inflator for inflating the airbag 9 and the like.

The curtain airbag device includes a curtain airbag 10 folded in an elongated shape and attached along the roof side rail 4, an inflator for inflating the curtain airbag 10 and the like. The folded airbag curtain 10 is covered with a roof side garnish. The folded curtain airbag 10 may extend to the A-pillar 5.

In this embodiment, the driver seat 6 is arranged on the left side of the vehicle 1, but may be arranged on the right side. When a slight lap crash or oblique crash that the left front end 1f of the vehicle 1 is crashed into an object is occurred, the inflator of the driver seat airbag device 3 and the inflator of the curtain airbag device are activated so that the driver seat airbag 9 is inflated and deployed toward a passenger side of the steering wheel 2. Also, the curtain airbag 10 is inflated and deployed downward from the roof side rail 4 along a left window or a B-pillar of the vehicle 1.

The curtain airbag 10 includes a first inflation portion 11, a second inflation portion 12 and a recess portion 13. The first inflation portion 11 is located at a passenger side of the vehicle body, i.e., a rear side of the vehicle body with respect to the inflated driver seat airbag 9 in a vehicle body longitudinal direction. The first inflation portion 11 is configured to be inflated toward a vehicle body-widthwise middle. The second inflation portion 12 is located at a wind shield 7 side of the vehicle body, i.e., a front side of the vehicle body with respect to the inflated driver seat airbag 9 in the vehicle body longitudinal direction. The second inflation portion 12 is configured to be inflated toward the vehicle body-widthwise middle. The recess portion 13 is formed between the inflation portions 11 and 12.

In order to form the recess portion 13, an inboard-side panel 10a and a door-side panel 10b of the curtain airbag 10 may be sewn to each other. Also, the sewn portion may be partially communicated with a general inflation area and the recess portion 13 may be a type in which inflation thereof is delayed.

The recess portion 13 is dented between the inflation portions 11 and 12 to be recessed from the inboard side toward the door side and is engaged with a left side portion of the inflated driver seat airbag 9. In a deployment completion state where the airbags 9 and 10 are inflated to the maximum volumes thereof, the left side portion of the driver seat airbag 9 is abutted against a lower portion of the recess portion 13, i.e., the most door-side portion thereof.

In the deployment completion state, a vehicle body-widthwise distance L1 from the most passenger-side portion of the first inflation portion 11, i.e., the most vehicle body-widthwise middle portion of the first inflation portion 11, to the center of the driver seat airbag 9, i.e., a center axis 2c of a steering shaft 2a is preferably 80 mm to 230 mm, in particular 130 mm to 230 mm.

A vehicle body-widthwise distance L2 between the most passenger-side portion of the second inflation portion 12, i.e., the most vehicle body-widthwise middle portion of the second inflation portion 12, and the lower portion of the recess portion 13 is preferably 25 mm or more, in particular 50 mm or more, for example 50 mm to 100 mm.

A vehicle body-longitudinal distance L4 from a passenger-side distal end of the first inflation portion 11 to the most passenger side of the driver seat airbag 9 on the center axis 2c of the steering shaft is preferably 100 mm or less.

Upon a slight lap crash or oblique crash, a head of the passenger is received by the inflated and deployed driver seat airbag 9 and the inflated and deployed curtain airbag 10.

Figure 3:
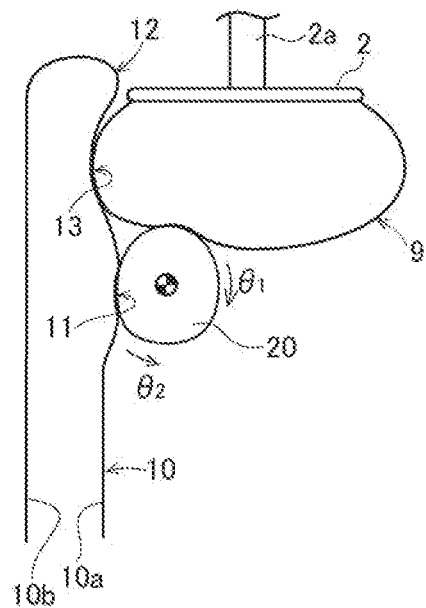
FIG. 3 is a schematic top view showing a state where a head of a passenger is retained by the passenger retaining apparatus according to the embodiment.

FIG. 3 shows a situation where a head 20 of a dummy is received by the airbags 9 and 10 upon a slight lap crash or oblique crash. Upon the slight lap crash or oblique crash, the head 20 is moved between an angle from a direction of an arrow 21 to a direction of an arrow 22. The direction of the arrow 21 and the direction of the arrow 22 are oriented toward a traveling direction of the vehicle, which is crashed at the vicinity of the left front end 1f of the vehicle body, as shown in FIG. 1. Thus, a front surface of the head 20 is bumped into the driver seat airbag 9. At substantially the same time, a left surface of the head 20 comes in contact with the first inflation portion 11 of the curtain airbag 10.

Due to the oblique crash, in which an intersection point with an arrow passing through the center of the head is offset from an actual contact point, and a friction between the airbag 9 and the passenger, the head 20 attempts to rotate in a clockwise θ1 in FIG. 3, but this rotation is prevented because the left surface of the head 20 is abutted against the first inflation portion 11. Also, due to a friction with the curtain airbag 10, the head portion 20 attempts to rotate in a count-clockwise θ2, but this rotation is prevented because the front surface (face) of the head 20 is abutted against the driver seat airbag 9.

Meanwhile, the driver seat airbag 9 is supported by the steering wheel 2 and also the left side portion of the driver seat airbag 9 is supported by the second inflation portion 12 of the curtain airbag 10. Accordingly, when the vicinity of the left side portion of the driver seat airbag 9 receives the head 20, the left side portion of the driver seat airbag 9 is inhibited from being retracted in a direction toward the A-pillar 5.

In the present invention, the left surface of the head 20 is preferably abutted against the first inflation portion 11 at substantially the same time as when the head 20 is moved in the direction of the arrow 21 so that the front surface of the head 20 is abutted against the driver seat airbag 9 and immediately the head starts to rotate in the clockwise θ1.

Upon a slight lap crash or oblique crash, a point of time, at which the front surface of the head 20 comes in contact with the driver seat airbag 9 and then the head starts to rotate, is substantially the same time as a point of time, at which the left surface of the head 20 comes in contact with the first inflation portion 11, if a vehicle body-widthwise distance between the left surface of the head 20 before crashing and the most passenger-side portion of the first inflation portion 11 upon completion of inflation is in a range of ±50 mm from a value calculated by the following equation:

$$D \cdot \tan \alpha + 80 \text{ (mm)}$$

where a movement distance of the front surface (face) of the head 20 in the direction of the arrow 21 until the head 20 comes in contact with the driver seat airbag 9 is D and an intersection angle between the direction of the arrow 21 or the direction of the arrow 22 and the vehicle body longitudinal direction is α.

Examples of a curtain airbag suitable to be used in the passenger retaining apparatus of the present invention will be described with reference to FIGS. 4 to 27.

Figure 4:
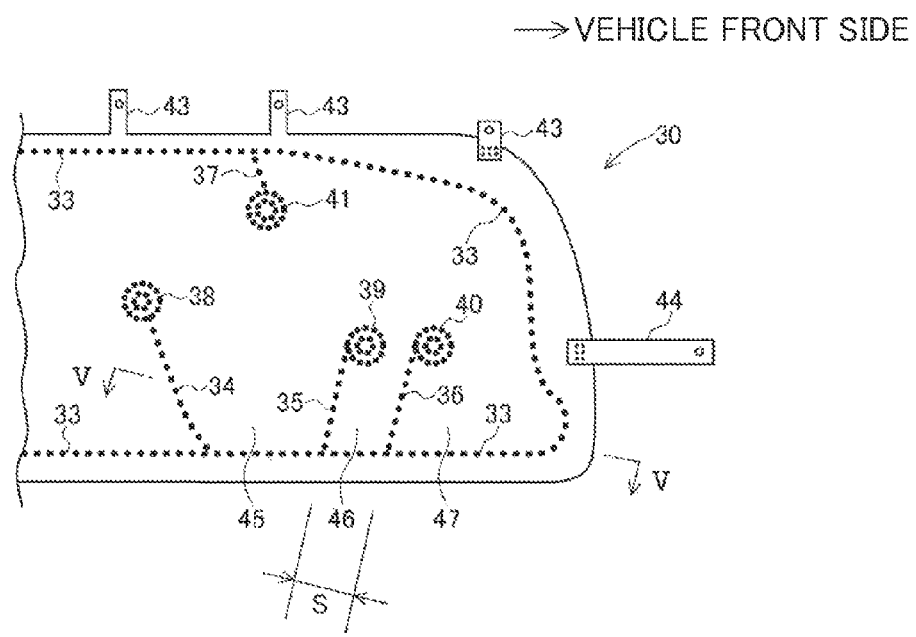
FIG. 4 is a side view showing a part of a curtain airbag of the passenger retaining apparatus according to the embodiment.
Figure 5:
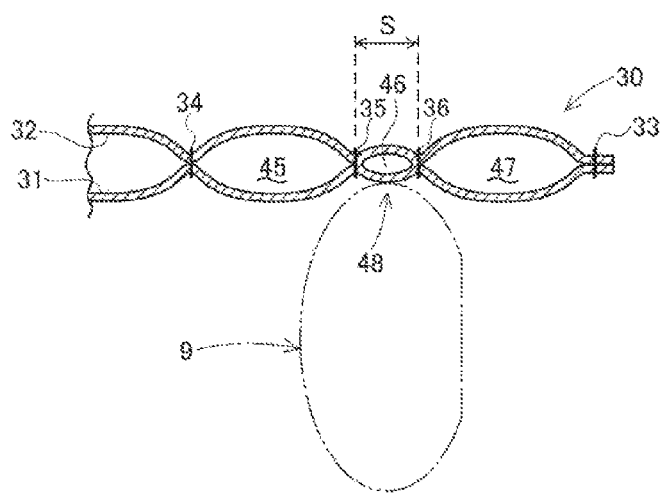
FIG. 5 is a sectional view taken along a V-V line in FIG. 4.

A curtain airbag 30 shown in FIGS. 4 and 5 is constructed by sewing an inboard-side panel 31 and a vehicle body-side panel 32 to each other. Reference numerals 33 to 40 designate sewn portions formed by sewing (hereinafter, referred to as seams). The seam 33 extends to circulate around outer peripheral edges of the panels 31 and 32. The seams 34, 35, 36 and 37 are connected at one ends thereof to the seam 33 and extend in a direction away from a peripheral edge of the curtain airbag 30. The other end of each of seams 34 to 37 is connected to annular seams 38 to 41. Meanwhile, in this embodiment, the annular seams 39 and 40 are located more toward the front side of the vehicle body relative to upper ends of the seam 35 and 36.

Attaching pieces 43 for fixing an upper edge of the curtain airbag 30 to the roof side rail of the vehicle body or upper portions of pillars extend from an upper side of the curtain airbag 30. An attaching piece 44 for fixing the curtain airbag 30 to the A-pillar extends from a side of the curtain airbag 30 located on the front side of the vehicle.

The seams 34 to 36 extend upward from the seam 33 extending along a lower side of the curtain airbag 30. The seams 35 and 36 extend to be generally parallel to each other and to have a forward-tilted shape so that upper portions thereof are located on the front side of the vehicle. A distance S between the seams 35 and 36 is suitably about 50 mm to 200 mm, in particular about 100 mm to 200 mm. The seam 34 extends to have a rearward-tilted shape, but the invention is not limited to that.

When the inflator is activated to inflate the curtain airbag 30, gas is supplied into the curtain airbag 30 so that the curtain airbag 30 is inflated as in FIG. 5. Inflated chambers 45, 46 and 47 are respectively formed between the seams 34 and 35, between the seams 35 and 36 and on a more front side than the seam 36.

Because the distance S between the seams 35 and 36 is smaller than a distance between the seams 34 and 35 and a distance between the seam 36 and the seam 33 located on the front peripheral edge of the curtain airbag, a thickness of the chamber 46 is smaller than thicknesses of the chambers 45 and 47 as in FIG. 5. Accordingly, a recess portion 48 is formed on the inboard side of the chamber 46. The recess portion 48 receives the left side portion of the driver seat airbag 9, like the recess portion 13 of the curtain airbag 10 of FIGS. 2 and 3. The inflated chamber 45 constitutes the first inflation portion and the inflated chamber 47 constitutes the second inflation portion 47.

In addition, because the seams 35 and 36 are tilted forward, the recess portion 48 is also tilted forward so that an upper portion thereof is located toward the vehicle front side. Because the driver seat airbag 9 is inflated along the steering wheel, the inflated driver seat airbag 9 is tilted forward so that an upper portion thereof is located toward the vehicle front side. A forward tilting angle of the recess portion 48 (forward titling angle of the seams 35 and 36) are generally the same as a forward tilting angle of the inflated driver seat airbag 9, so that the left side portion of the inflated driver seat airbag 9 is engaged with the recess portion 48.

Figure 6:
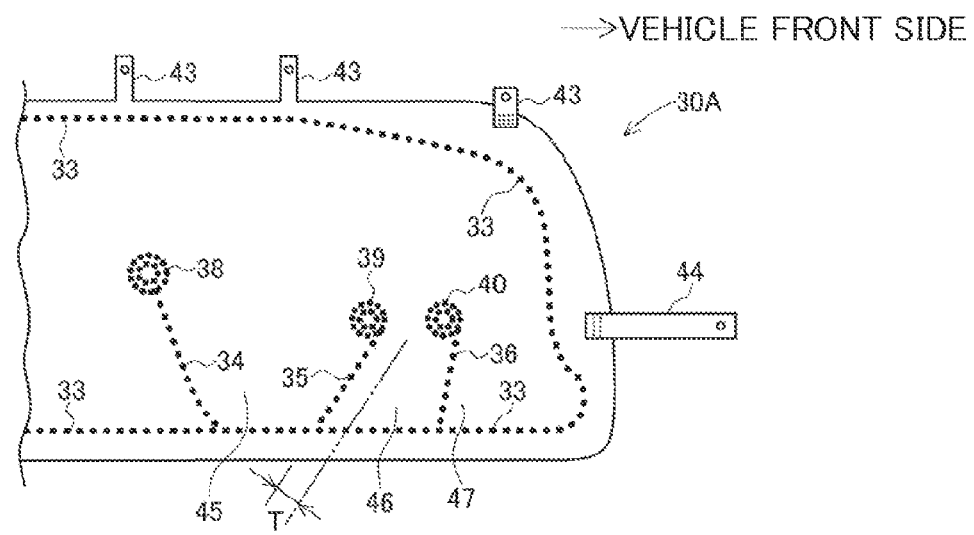
FIG. 6 is a side view showing a part of the curtain airbag of the passenger retaining apparatus according to the embodiment.

In a curtain airbag 30A of FIG. 6, annular seams 39 and 40 are respectively located on vehicle rear sides of upper ends of seams 35 and 36. Also, the seam 35 is tilted forward more than that in FIG. 4 and the seam 36 is tilted forward less than that in FIG. 4.

In addition, a distance T between the seam 35 and a tangent line to a rear portion side of the annular seam 40 (tangent line parallel to the seam 35) is preferably 30 mm to 120 mm, in particular 40 mm to 120 mm. In this curtain airbag 30A, a seam 37 and an annular seam 41 on an upper side thereof are omitted.

The other configurations of the curtain airbag 30A are the same as those of the curtain airbag 30 and the same reference numerals designate the same parts. Also, the curtain airbag 30A has the same effects as those of the curtain airbag 30.

Figure 7:
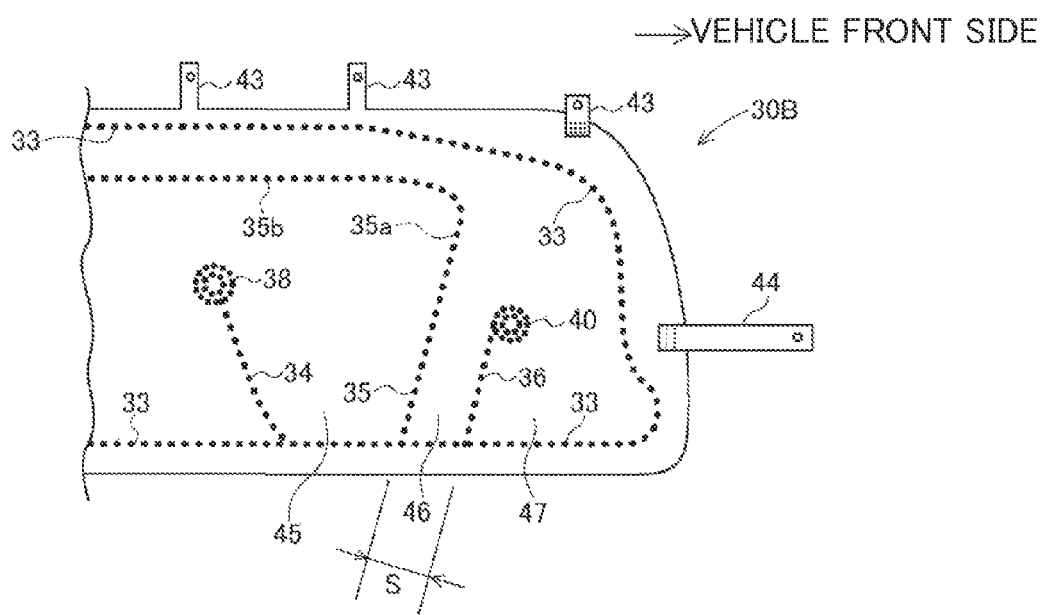
FIG. 7 is a side view showing a part of the curtain airbag of the passenger retaining apparatus according to the embodiment.

A curtain airbag 30B of FIG. 7 is configured so that the annular seam 39 in the curtain airbag 30A of FIG. 6 is omitted and the seam 35 is further extended. Meanwhile, seams 35 and 36 are generally parallel to each other. An upper end of the seam 35 is connected to a longitudinal seam 35a extending in an extension direction of the seam 35. A front end of a transversal seam 35 is connected to an upper end of the longitudinal seam 35. The transversal seam 35b extends toward the vehicle rear side. A distance S between the seams 35 and 36 is suitably about 50 mm to 200 mm, in particular about 100 mm to 200 mm.

The other configurations of the curtain airbag 30B are the same as those of the curtain airbag 30A and the same reference numerals designate the same parts. Also, the curtain airbag 30B has the same effects as those of the curtain airbag 30.

Figure 8:
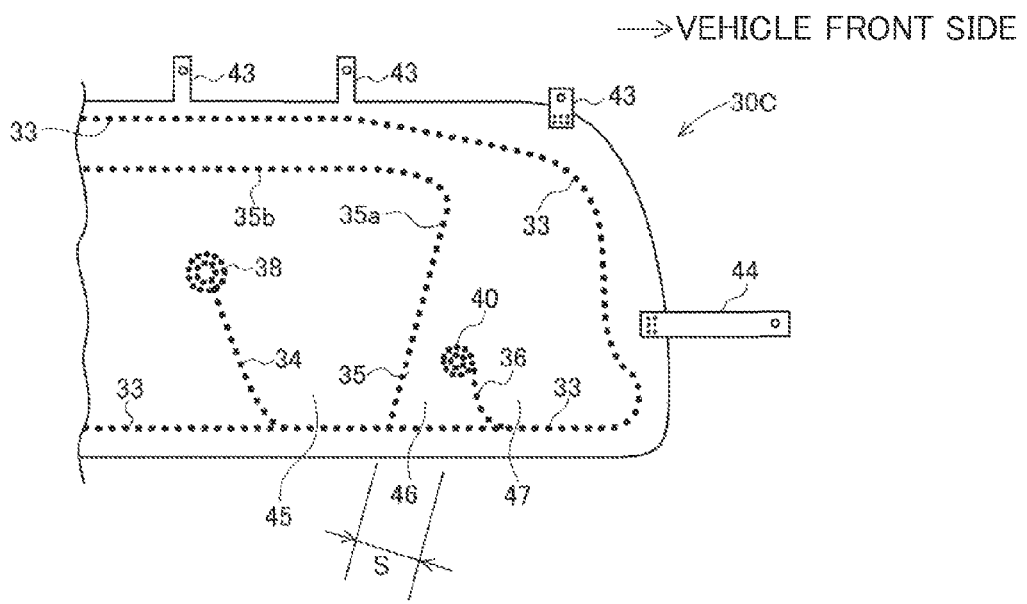
FIG. 8 is a side view showing a part of the curtain airbag of the passenger retaining apparatus according to the embodiment.

A curtain airbag 30C of FIG. 8 is configured so that the seam 36 in the curtain airbag 30B of FIG. 7 has a rearward-tilted shape and thus a lower portion thereof is located toward the vehicle front side. In this case, a distance S between a vehicle front-side end of an annular seam 40 and the seam 35 is preferably 50 mm to 200 mm, in particular 100 mm to 200 mm.

The other configurations of the curtain airbag 30C are the same as those of the curtain airbag 30B and the same reference numerals designate the same parts. Also, the curtain airbag 30C has the same effects as those of the curtain airbag 30.

Figure 9:
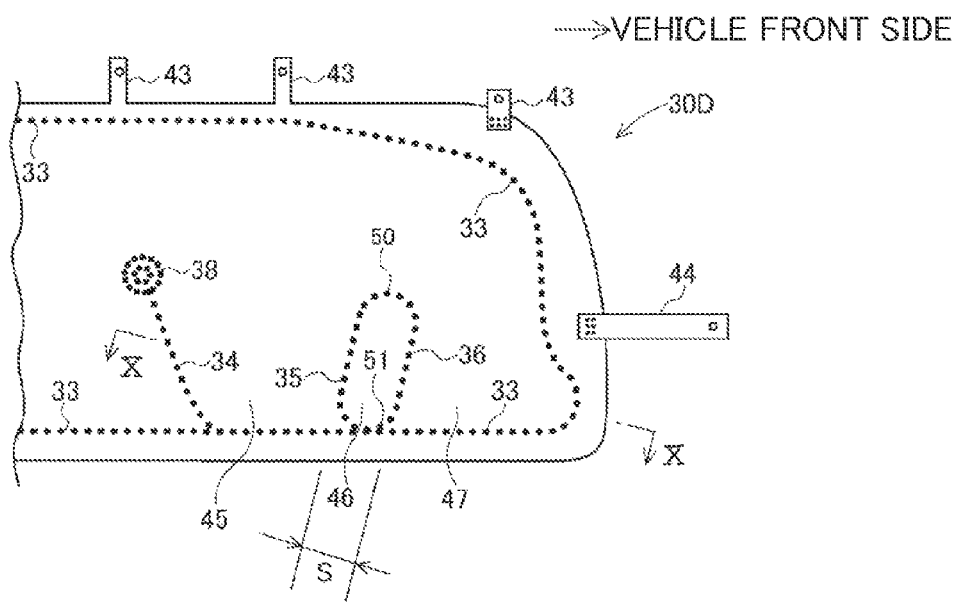
FIG. 9 is a side view showing a part of the curtain airbag of the passenger retaining apparatus according to the embodiment.
Figure 10:
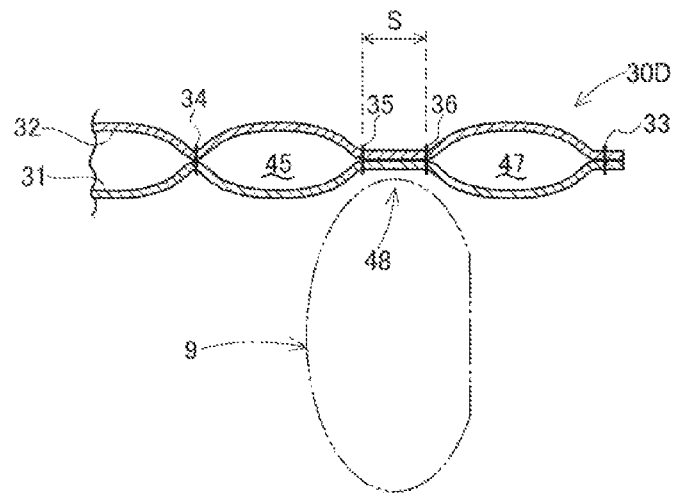
FIG. 10 is a sectional view taken along an X-X line in FIG. 9.

A curtain airbag 30D of FIGS. 9 and 10 is configured so that the annular seams 39, 40 and 41 in the curtain airbag 30 of FIGS. 4 and 5 are omitted and the seam 37 on the upper side thereof is also omitted. In the curtain airbag 30D, upper ends of seams 35 and 36 are connected to each other via a seam 50 extending in a half-circle shape. Also, lower end of the seams 35 and 35 are connected to each other via a seam 51 extending in a half-circle shape. This half-circular seam 51 is overlapped with a seam 35. A distance S between the seams 35 and 36 is suitably about 50 mm to 200 mm, in particular about 100 mm to 200 mm The other configurations of the curtain airbag 30D are the same as those of the curtain airbag 30 and the same reference numerals designate the same parts. Also, the curtain airbag 30D has the same effects as those of the curtain airbag 30. Meanwhile, when the curtain airbag 30D is inflated, gas from the inflator is not supplied into a chamber surrounded by seams 35, 36, 50 and 51, and as a result, panels 31 and 32 are overlapped with each other in a region of a chamber 46 even in an inflated state of FIG. 10. Accordingly, a depth of a recess portion 48 is deeper than that in the curtain airbag 30.

Figure 11:
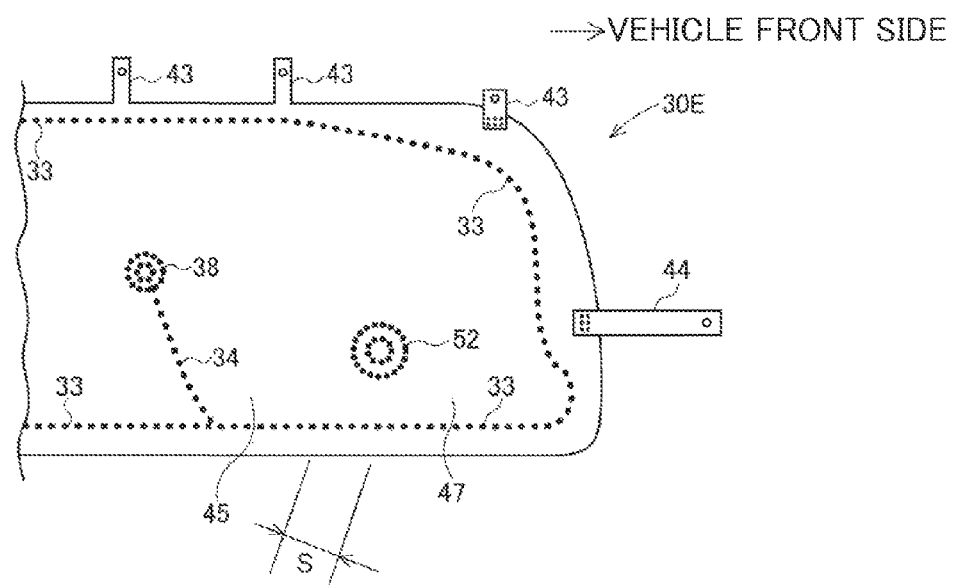
FIG. 11 is a side view showing a part of the curtain airbag of the passenger retaining apparatus according to the embodiment.

A curtain airbag 30E shown in FIG. 11 is configured so that instead of the seams 35, 36, 50 and 51 in the curtain airbag 30D of FIGS. 9 and 10, an annular seam 52 having a circular ring shape is provided. In this case, a diameter of the annular seam 52 is preferably 50 mm to 200 mm, in particular 10 mm to 200 mm. The annular seam 52 is located to face the side portion of the inflated driver seat airbag 9 (not shown in FIG. 11) on the most left end side thereof.

The other configurations of the curtain airbag 30E are the same as those of the curtain airbag 30D and the same reference numerals designate the same parts. Also, the curtain airbag 30E has the same effects as those of the curtain airbag 30.

Figure 12:
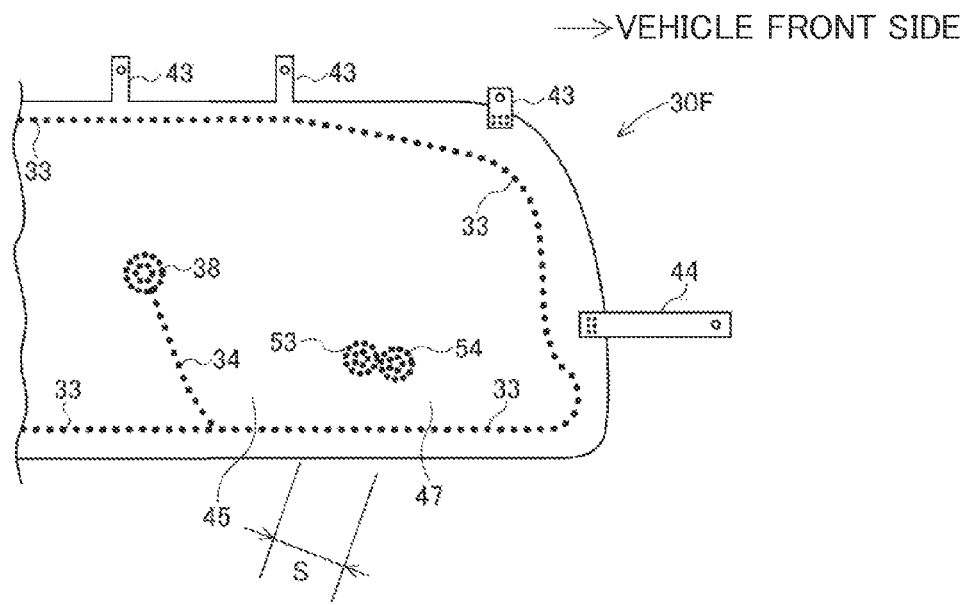
FIG. 12 is a side view showing a part of the curtain airbag of the passenger retaining apparatus according to the embodiment.

A curtain airbag 30F shown in FIG. 12 is configured so that instead of the annular seam 52 in the curtain airbag 30E of FIG. 11, two small diameter annular seams 53 and 54, of which diameters are half of the diameter of the annular seam 52, are provided to be in contact with each other. A direction connecting center points of the annular seams 53 and 54 is a direction perpendicular to an extension direction of the seams 35 and 36 in FIG. 4. A position of a contact point between the annular seams 53 and 54 is the same as the center position of the annular seam 52 of FIG. 11. The sum of diameters of the annular seams 53 and 54 is suitably about 50 mm to 200 mm, in particular about 100 mm to 200 mm.

The other configurations of the curtain airbag 30F are the same as those of the curtain airbag 30E and the same reference numerals designate the same parts. Also, the curtain airbag 30F has the same effects as those of the curtain airbag 30.

Figure 13:
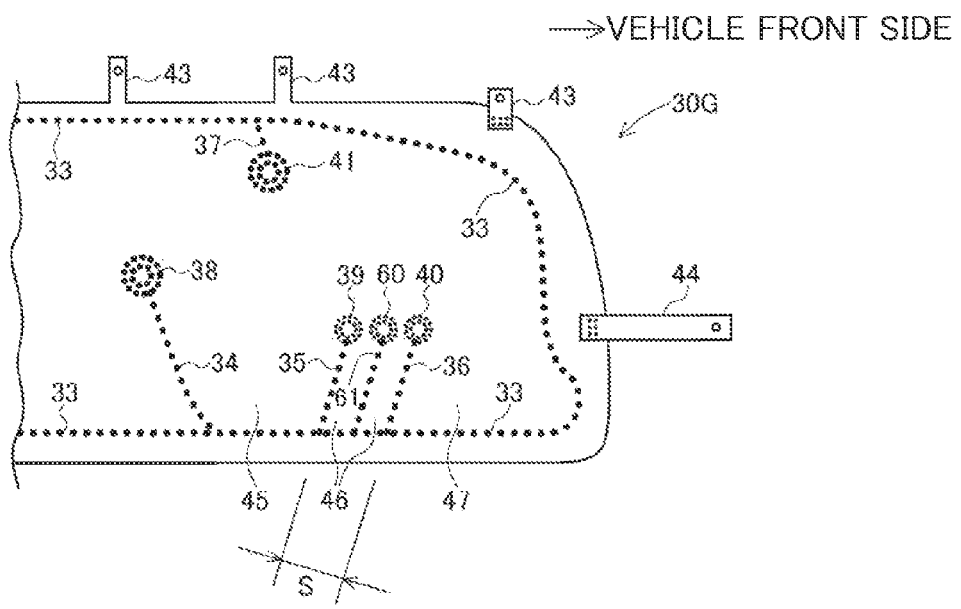
FIG. 13 is a side view showing a part of the curtain airbag of the passenger retaining apparatus according to the embodiment.

A curtain airbag 30G shown in FIG. 13 is configured so that a seam 61 is provided between seams 35 and 36 to be generally parallel to the seams 35 and 36 and an annular seam 60 is provided on an upper end of the seam 61. A lower end of the seam 61 is connected to a seam 33. Extension lines of seams 39, 40 and 60 are respectively adapted to extend through the vicinities of the centers of the annular seams 39, 40 and 60, but the invention is not limited to that. A distance S between the seams 35 and 36 is suitably about 50 mm to 200 mm, in particular about 100 mm to 200 mm.

The other configurations of the curtain airbag 30G are the same as those of the curtain airbag 30 and the same reference numerals designate the same parts. Also, the curtain airbag 30G has the same effects as those of the curtain airbag 30.

Figure 14:
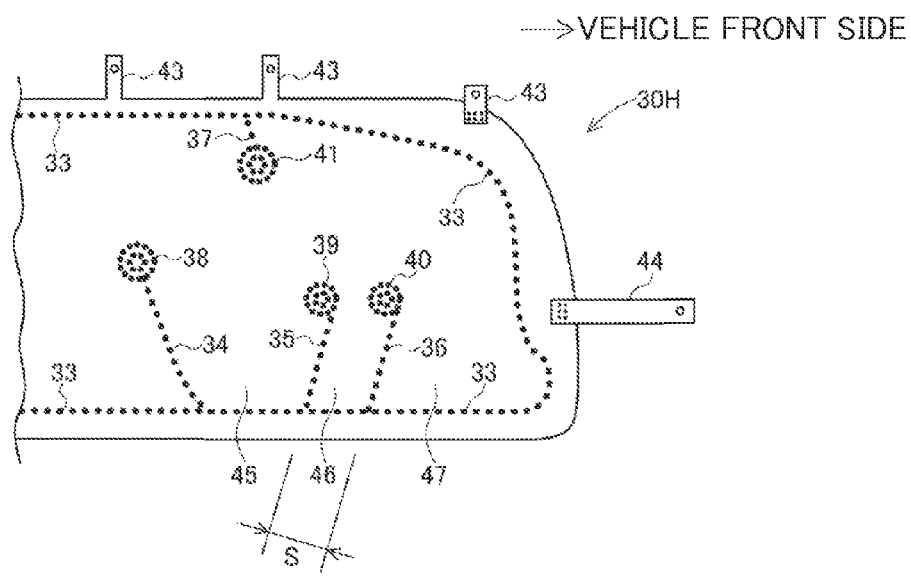
FIG. 14 is a side view showing a part of the curtain airbag of the passenger retaining apparatus according to the embodiment.

A curtain airbag 30H shown in FIG. 14 is configured so that annular seams 39 and 40 are located more toward the vehicle rear side relative to upper ends of seams 35 and 36, but extension lines of the seams 35 and 36 extend through the vicinities of the centers of the annular seams 39 and 40. A distance S between the seams 35 and 36 is suitably about 50 mm to 200 mm, in particular about 100 mm to 200 mm. The other configurations of the curtain airbag 30H are the same as those of the curtain airbag 30 and the same reference numerals designate the same parts. Also, the curtain airbag 30H has the same effects as those of the curtain airbag 30.

Figure 28:
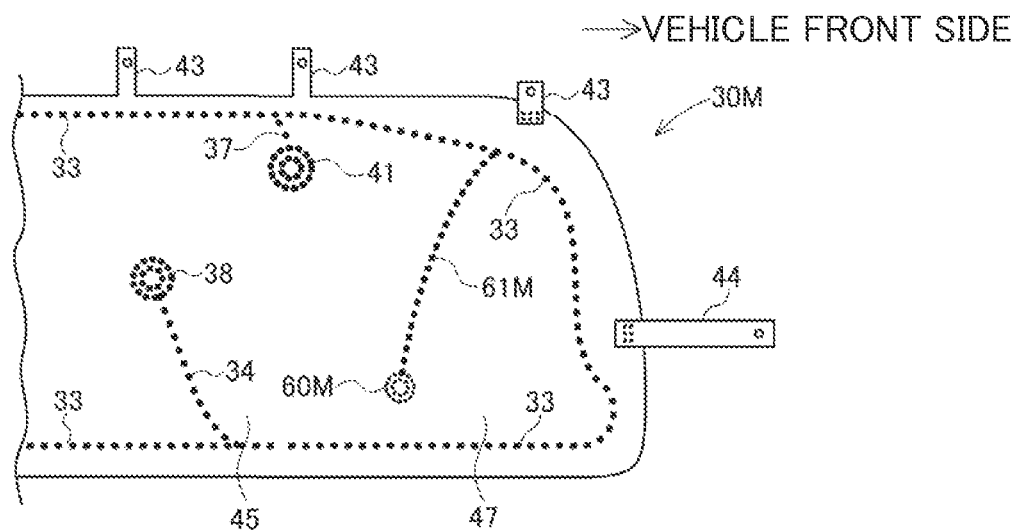
FIG. 28 is a side view showing a part of the curtain airbag of the passenger retaining apparatus according to the embodiment.

A curtain airbag 30M shown in FIG. 28 is configured so that an annular seam 60M is provided at a position slightly below the position, at which the annular seam 60 in FIG. 13 is provided, and a seam 61M is provided between the annular seam 60M and a seam 33 on an upper side thereof. The annular seams 39, 40 and 60 and the seams 35, 36 and 61 of FIG. 13 are not provided.

The other configurations of the curtain airbag 30M are the same as those of the curtain airbag 30 and the same reference numerals designate the same parts. Also, the curtain airbag 30M has the same effects as those of the curtain airbag 30.

Figure 29:
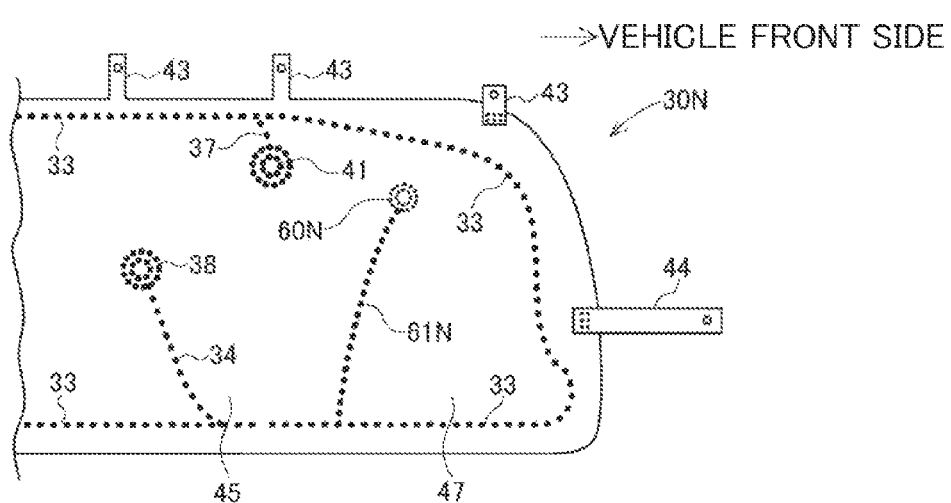
FIG. 29 is a side view showing a part of the curtain airbag of the passenger retaining apparatus according to the embodiment.

A curtain airbag 30N shown in FIG. 29 is configured so that an annular seam 60N is provided at a position above the position, at which the annular seam 60M in FIG. 28 is provided, and a seam 61N is provided between the annular seam 60N and a seam 33 on a lower side thereof. The annular seam 60M and the seam 61M of FIG. 28 are not provided.

The other configurations of the curtain airbag 30N are the same as those of the curtain airbag 30 and the same reference numerals designate the same parts. Also, the curtain airbag 30N has the same effects as those of the curtain airbag 30.

An embodiment of a curtain airbag having a shallowing unit which shallows a recess portion will be described with reference to FIGS. 15 to 16. The shallowing unit is configured so that after first and second inflation portions of the curtain airbag are inflated to form the recess portion and the recess portion receives a side end portion of a driver seat airbag, a depth of the recess portion is decreased to tightly contact the curtain airbag with the driver seat airbag.

Figure 15:
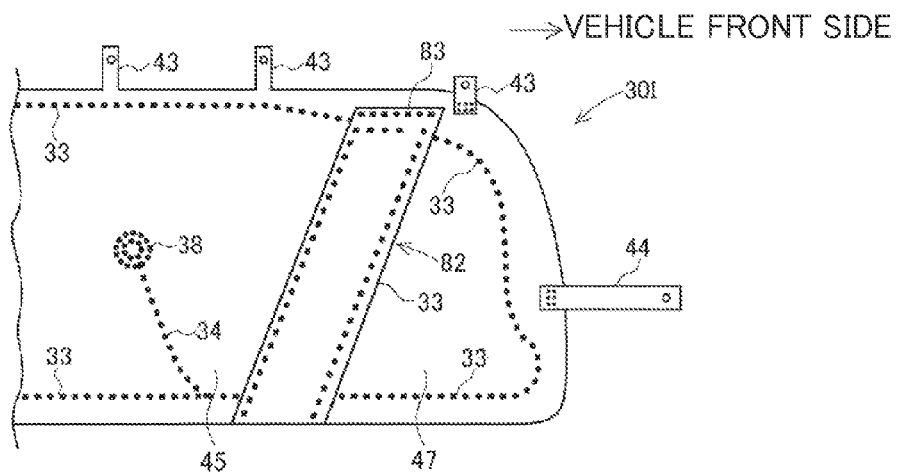
FIG. 15 is a side view showing a part of the curtain airbag of the passenger retaining apparatus according to the embodiment.
Figure 16:
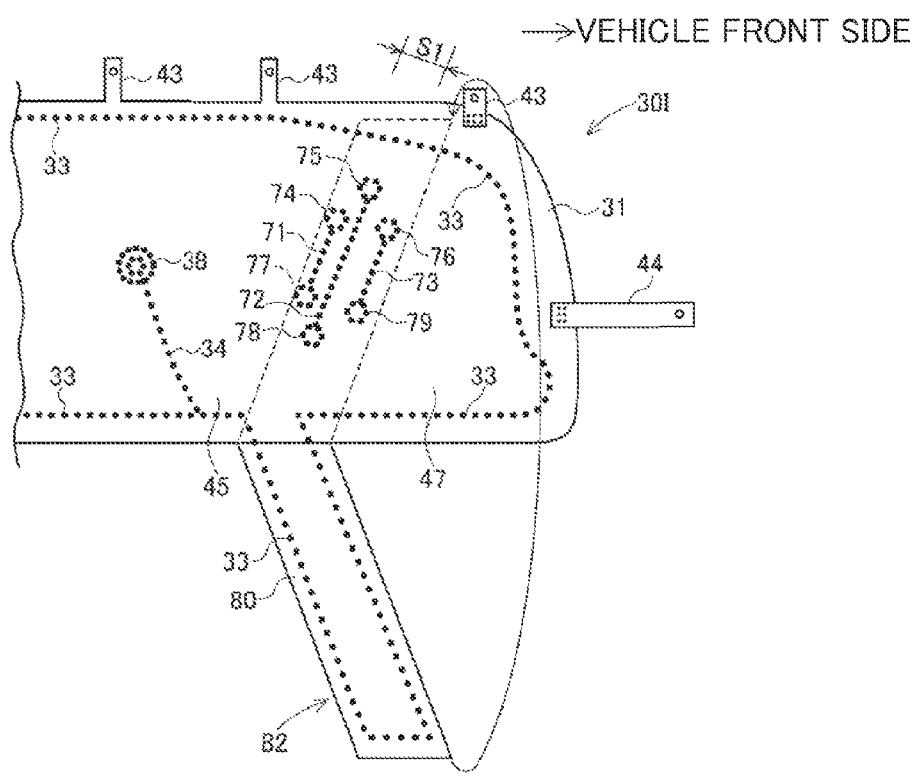
FIG. 16 is a view explaining a structure of the curtain airbag of the passenger retaining apparatus of FIG. 15.

FIGS. 15 and 16 show a curtain airbag 30I having a delayed inflation portion, of which inflation is delayed relative to the first and second inflation portions, between the recess portion and the driver seat airbag. Meanwhile, FIG. 16 shows a state before an upper portion of the delayed inflation portion 82 is sewn to a main body portion of the curtain airbag 30I by a seam 83. In the curtain airbag 30I, the annular seam 52 in the curtain airbag 30E of FIG. 11 is omitted. As shown in FIG. 16, the curtain airbag 30I is provided with three straight line-shaped seams 71 to 73 instead of the annular seam 52. The seams 71 to 73 extend to be generally parallel to each other and to have a forward-tilted shape so that upper portions thereof are located on the front side of the vehicle. A distance S between the seams 71 and 73 is suitably about 50 mm to 200 mm, in particular about 100 mm to 200 mm. The seam 72 is provided generally on the middle between the seam 71 and the seam 73. The seams 71 to 73 are located to face the side portion of the inflated driver seat airbag 9 (not shown in FIG. 11) on the most left end side thereof.

The seams 71 to 73 are connected at one end sides (upper end sides) thereof to annular seams 74 to 76 and connected at the other end sides (lower end sides) to annular seams 77 to 79. The seam 71 and the seam 73 have generally the same length. The seam 72 is provided to be longer than the seams 71 and 73, so that the annular seam 75 connected to the one end side of the seam 72 is located above the annular seams 74 and 74 connected to the one end sides of the seams 71 and 73. The annular seam 78 connected to the other end side of the seam 72 is located below the annular seams 77 and 79 connected to the other end sides of the seam 71 and 73.

In this curtain airbag 30I, protrusion portions 80 are respectively provided to protrude from lower sides of an inboard-side panel 31 and a vehicle body-side panel 32 (not shown), and peripheral edges of the protrusion portions 80 of the panels 31 and 32 are sewn to each other by a seam 33, thereby forming the delayed inflation portion 82 protruding from the main body portion of the curtain airbag 30I.

The seam 33 extending along a lower side of the curtain airbag 30I extends to circulate around outer peripheral edges of the protrusions 90. An inside of the delayed inflation portion 82 is communicated with an inside of the main body portion of the curtain airbag 30I.

The delayed inflation portion 82 is folded upward along the lower side of the curtain airbag 30I and is folded up onto the inboard side of the main body portion of the curtain airbag 30I. Also, as shown in FIG. 15, an upper edge of the delayed inflation portion 82 is sewn to the panels 31 and 31 by a seam 83.

As shown in FIG. 16, the protrusion portion 80 protrudes from the lower sides of the panels 31 and 32 in a forward-tilted shape so that a lower portion thereof is located toward the vehicle front side. Accordingly, the delayed inflation portion 82 folded upward has a forward-tilted shape so that an upper portion thereof is located toward the vehicle the front side. As shown in FIG. 15, seams 71 to 73 and annular seams 74 to 79 are covered with the folded delayed inflation portion 82.

When an inflator for inflating the curtain airbag 30I is activated, gas is supplied into the curtain airbag 30I. Because a distance between the seams 71 and 72 and a distance between the seams 72 and 73 are short, thicknesses of chambers formed by the seams 71 to 73 are smaller than thicknesses of chambers 45 and 47 so that the recess portion for receiving the left side portion of the inflated drive seat airbag 9 is formed.

Because the delayed inflation portion 82 is folded at the lower side of the curtain airbag 30I, a velocity of gas which is flowed therein is slow so that inflation thereof is delayed relative to the chamber 45 (first inflation portion) and the chamber 47 (second inflation portion). The delayed inflation portion 82 is inflated between the vicinities of the seams 71 to 73 of the main body portion of the curtain airbag 30I and the driver seat airbag 9 and thus is strongly contacted with the driver seat airbag 9. Accordingly, a configuration for preventing a head of a passenger from entering a gap between the curtain airbag 30I and the drive seat airbag 9 can be simply realized.

Thus, at an initial stage of inflation of the curtain airbag 30I, the recess portion formed by the seams 71 to 73 receives the left side portion of the driver seat airbag 9 so that when the vicinity of the left side portion of the driver seat airbag 9 receives the head of the passenger, the driver seat airbag 9 can be inhibited from being retracted a direction toward the A-pillar. Then, the delayed inflation portion 82 is delayedly inflated and strongly contacted with the driver seat airbag 9, and thus the simple configuration for preventing the head of the passenger from entering a gap between the curtain airbag 30I and the drive seat airbag 9 can be realized.

A curtain airbag 30J shown in FIGS. 17 to 22 is configured so that a recess portion is formed at an initial stage of inflation of the curtain airbag and receives the driver seat airbag 9 and then the recess portion is pushed toward the driver seat airbag 9, thereby decreasing a depth of the recess portion.

Figure 17:
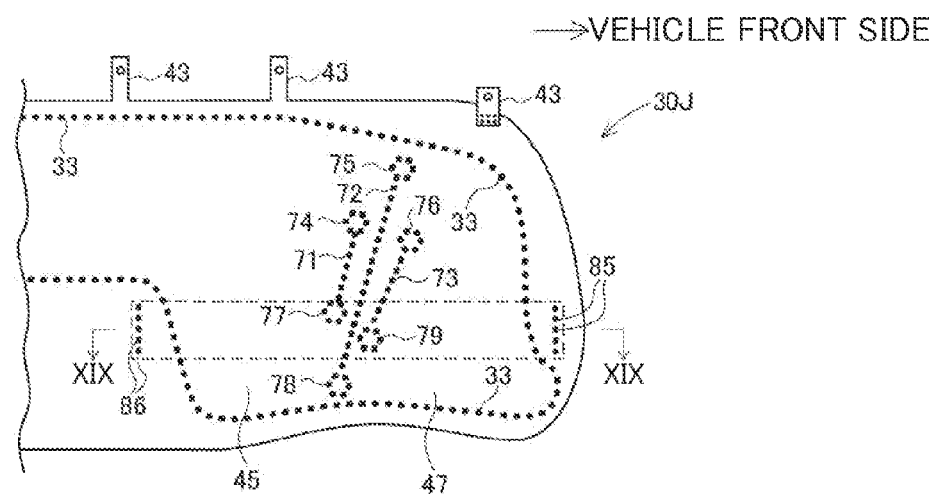
FIG. 17 is a side view showing a part of the curtain airbag of the passenger retaining apparatus according to the embodiment.
Figure 18:
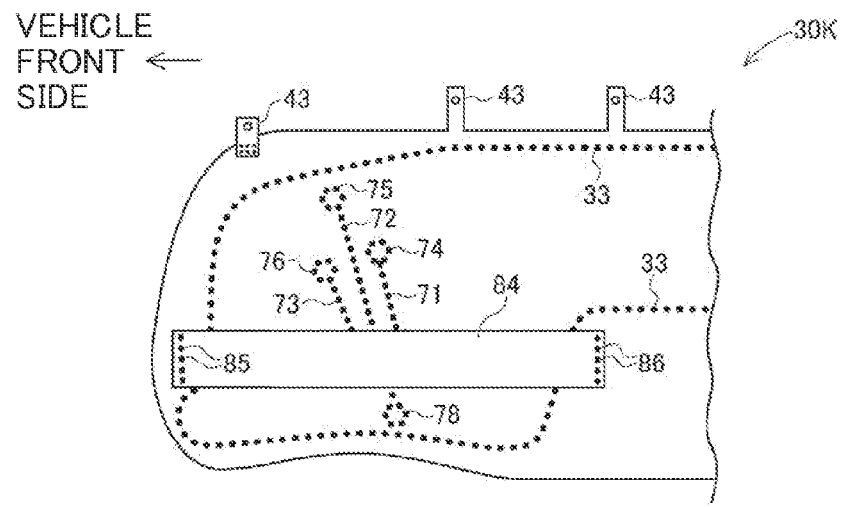
FIG. 18 is a side view showing a vehicle body side of the curtain airbag of the passenger retaining apparatus of FIG. 17.
Figure 19:
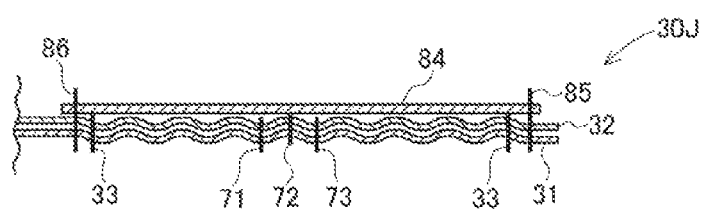
FIG. 19 is a sectional view taken along a XIX-XIX line in FIG. 17.
Figure 20:
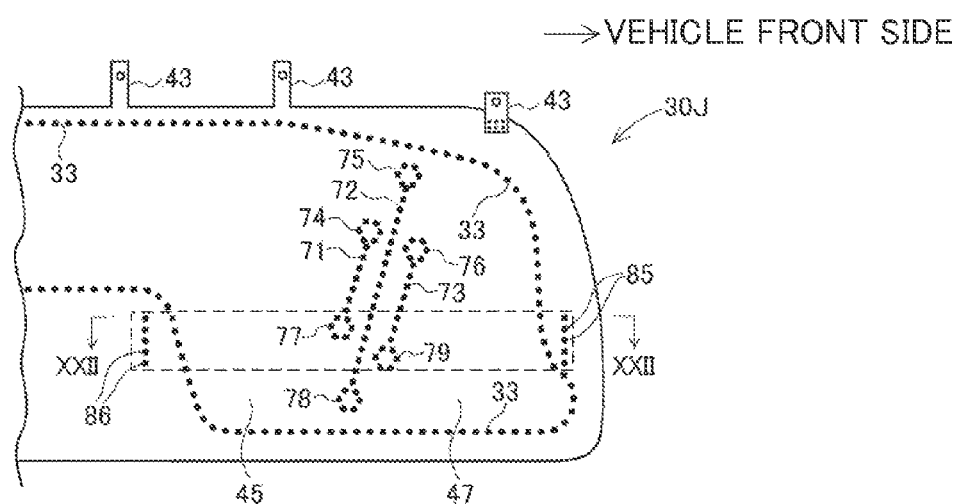
FIG. 20 is a side view showing the curtain airbag of the passenger retaining apparatus of FIG. 17 during inflation thereof.
Figure 21:
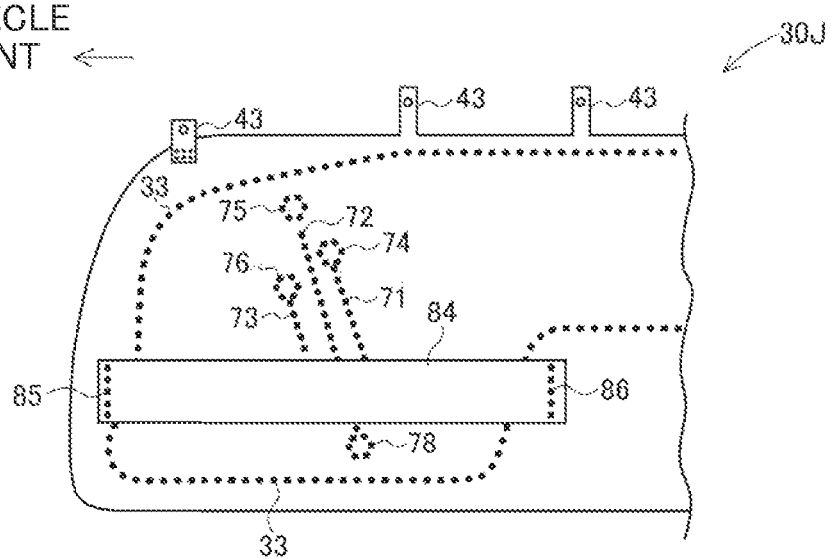
FIG. 21 is a side view showing the vehicle body side of the curtain airbag of the passenger retaining apparatus of FIG. 17 during inflation thereof.
Figure 22:
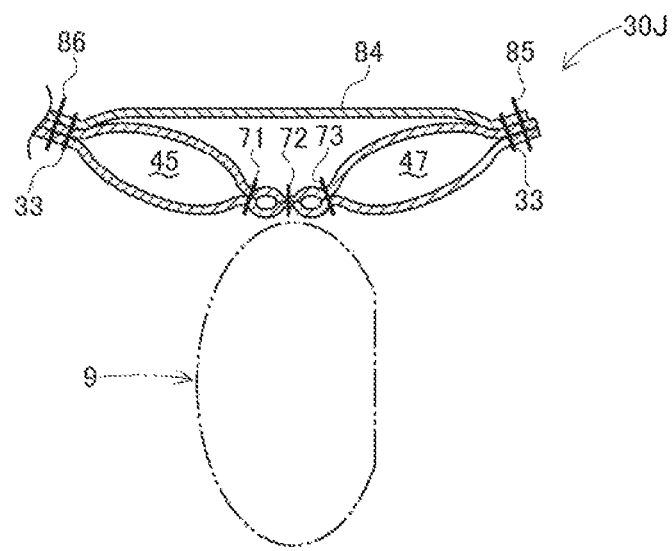
FIG. 22 is a sectional view taken along a XXII-XXII line in FIG. 20.

Meanwhile, FIG. 17 is a side view of a front portion of the curtain airbag 30J before inflation as viewed from the inboard side, FIG. 18 is a side view of the front portion of the curtain airbag 30J as viewed from the vehicle body side, FIG. 19 is a sectional view taken along a XIX-XIX line in FIG. 17, FIG. 20 is a side view of the front portion of the curtain airbag 30J after inflation as viewed from the inboard side, FIG. 21 is a side view of the front portion of the curtain airbag 30J after inflation as viewed from the vehicle body side, and FIG. 22 is a sectional view taken along a XXII-XXII line in FIG. 20.

In the curtain airbag 30J, the delayed inflation portion 82 in the curtain airbag 30I of FIGS. 15 and 16 is omitted. In the curtain airbag 30J, an outboard-side surface of the vehicle body-side panel 32 is provided with a tether 84 formed in a slender rectangular shape along the vehicle body longitudinal direction. Both ends of the tether 84 in the vehicle body longitudinal direction are sewn to the panels 31 and 32 by seams 85 and 86. A position of the tether 84 in an upward and downward direction of the vehicle body is generally the same as those of annular seams 77 and 79.

As shown in FIG. 19, a length of the tether 84 between seams 85 and 86 is set to be smaller than a distance of the panels 31 and 32 of the curtain airbag 30J between the seams 85 and 86. As a material of the tether 84, the same as those of the panels 31 and 32 may be used.

A seam 72 of the curtain airbag 30J is set to be longer than the seam 72 of the curtain airbag 30I. Accordingly, the annular seams 75 and 78 of the curtain airbag 30J are located to be closer to the seam 33 as compared to the annular seams 75 and 78 of the curtain airbag 30I, thereby narrowing a distance between the annular seams 75 and 78 and the seam 33.

The seam 33 extending along a lower side of the curtain airbag 30J is erected at a location, which is located more toward the vehicle front side than the seam 86, and thus extends from a location, which is located above the seam 86, toward the vehicle rear side.

When an inflator for inflating the curtain airbag 30J is activated, gas is supplied into the curtain airbag 30J so that the curtain airbag 30J is inflated. At an initial state of inflation, chambers 45 and 47 are inflated toward the inboard side and a recess portion is formed therebetween to receive the left end portion of the driver seat airbag 9. Namely, because a distance between the seams 71 and 72 and the distance between the seams 72 and 73 are short, thicknesses of chambers formed by the seams 71 to 73 are smaller than thicknesses of chambers 45 and 47 so that the recess portion for receiving the left side portion of the inflated drive seat airbag 9 is formed. Meanwhile, because a distance between the annular seams 75 and 78 and the seam 33 is set to be narrow, the chamber 47 is delayedly inflated relative to the chamber 45.

In the curtain airbag 30J, because a vehicle rear side of the chamber 45 and a vehicle front side of the chamber 47 are sewn to the tether 84 by the seams 86 and 85, the recess portion formed by the seams 71 to 73 is pushed out toward the inboard side as in FIG. 22, if the curtain airbag 30J is further inflated. Thus, the recess portion and the driver seat airbag 9 can be strongly contacted with each other, and thus a configuration for preventing a head of a passenger from entering a gap between the curtain airbag 30J and the drive seat airbag 9 can be simply realized.

In this way, the curtain airbag 30J has also the same effects as those of the curtain airbag 30I.

Figure 23:
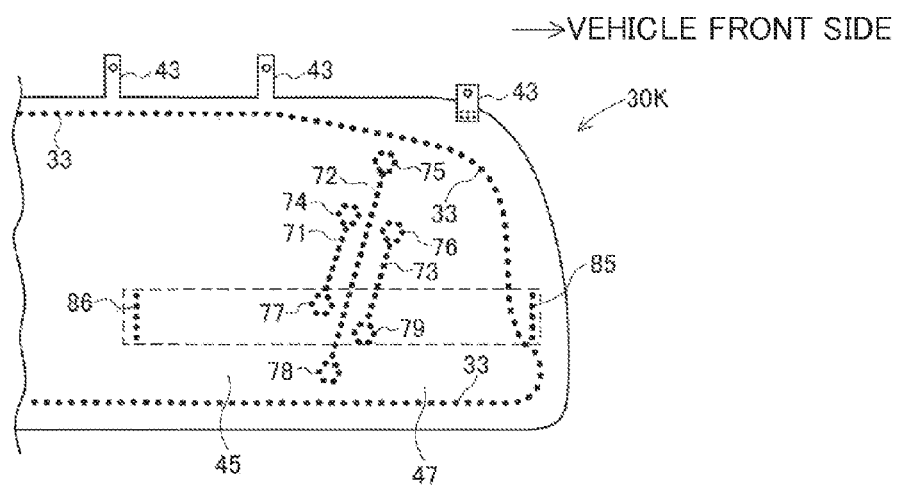
FIG. 23 is a side view showing a part of the curtain airbag of the passenger retaining apparatus according to the embodiment.
Figure 24:
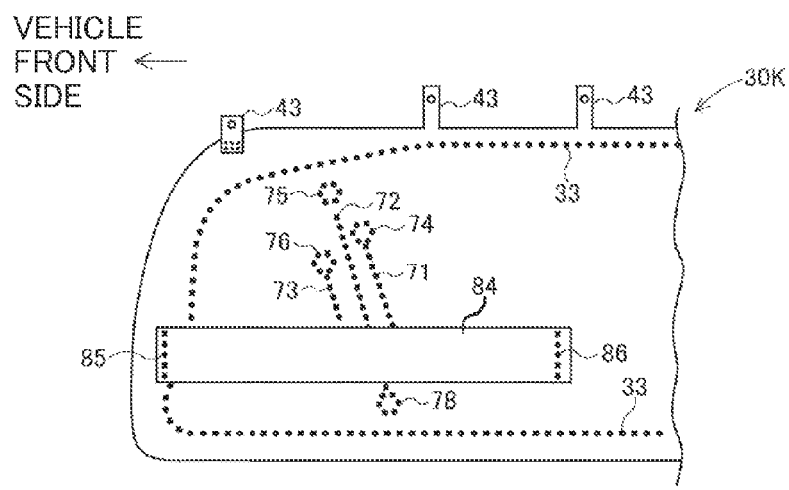
FIG. 24 is a side view showing a vehicle body side of the curtain airbag of the passenger retaining apparatus of FIG. 23.

A curtain airbag 30K shown in FIGS. 23 and 24 is configured so that the seam 33 in the curtain airbag 30J of FIGS. 17 to 22 extends along a lower side of the curtain airbag. Meanwhile, FIG. 23 shows the same portion as that of FIG. 20 and FIG. 24 shows the same portion as that of FIG. 21. The other configurations are the same as those of the curtain airbag 30J and the same reference numerals designate the same parts. Also, the curtain airbag 30K has the same effects as those of the curtain airbag 30J.

Figure 25:
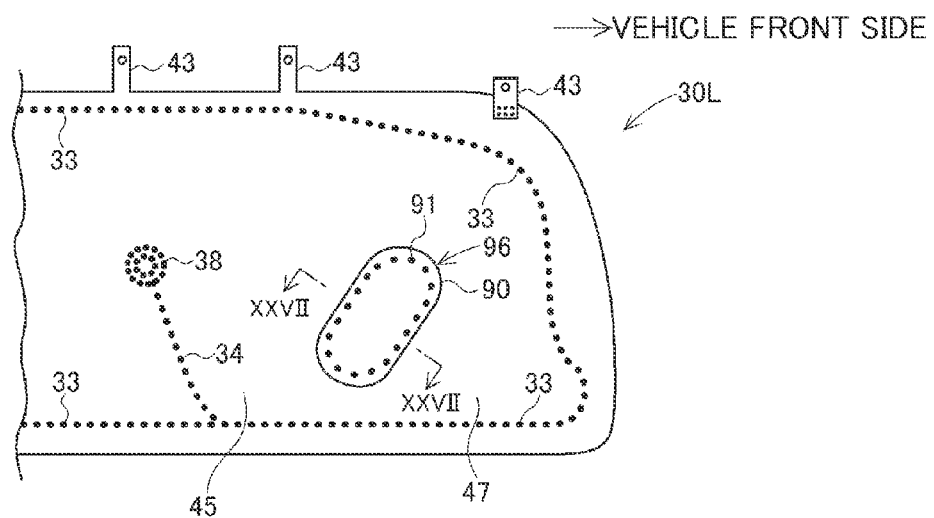
FIG. 25 is a side view showing a part of the curtain airbag of the passenger retaining apparatus according to the embodiment.
Figure 26:
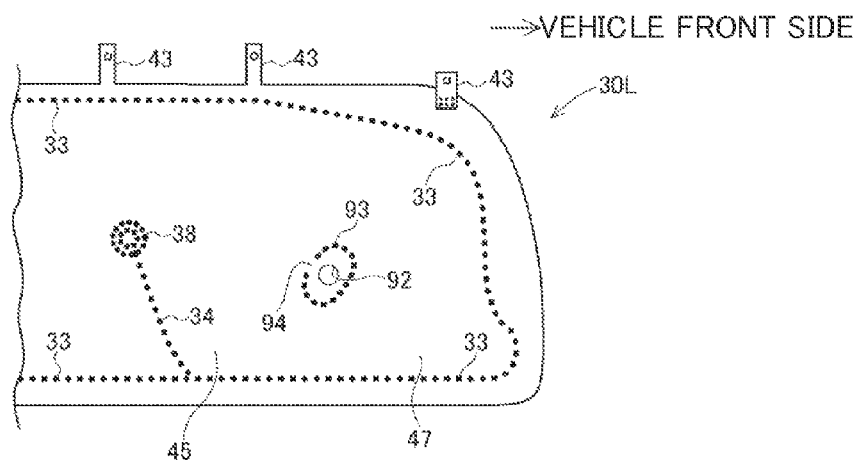
FIG. 26 is a side view of the curtain airbag of the passenger retaining apparatus with a small panel removed therefrom.
Figure 27:
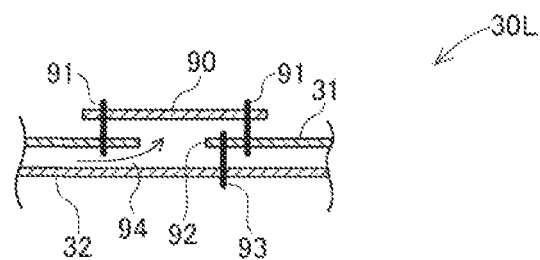
FIG. 27 is a schematic sectional view taken along a XXVII-XXVII line in FIG. 25.

FIGS. 25 to 27 show a curtain airbag 30L according to further another embodiment. Meanwhile, FIG. 25 shows the same portion as that of FIG. 17. FIG. 26 shows a configuration in which a small panel 90 in FIG. 25 is removed. FIG. 27 shows a sectional view taken along a XXVII-XXVII line in FIG. 25.

In the curtain airbag 30L, the annular seam 52 in the curtain airbag 30E of FIG. 11 is omitted. As shown in FIG. 26, the curtain airbag 30I has a hole 92 formed in an inboard-side panel 31. The panel 31 is sewn to a panel 32 by a seam 93 at a periphery of the hole 92. The seam 93 does not fully circulate around the periphery of the hole 92, but is partially interrupted on the way to form a communication portion 94. Meanwhile, the seam 93 has an elliptical shape elongated in an upward and downward direction. A direction of the major axis of the elliptical shape is oriented so that an upper portion thereof is located toward the vehicle front side.

As shown in FIG. 25, the small panel 90 is provided on an inboard-side surface of the panel 31 to cover the hole 92 and the seam 93. The entire peripheral edge of the small panel 90 is sewn to the panel 31 by a seam 91. The small panel 90 has an elliptical shape. A delayed inflation portion 96 is formed by the small panel 90. The small panel 90 is elongated in the upward and downward direction and is configured so that an upper portion thereof is located toward the vehicle front side. Accordingly, the delayed inflation portion 96 has a forward-tilted shape so that an upper portion thereof is located toward the vehicle front side.

As shown in FIG. 27, the small panel 90 is sewn to the panel 31, but not sewn to the panel 32. Accordingly, gas is supplied from the main body portion of the curtain airbag into the delayed inflation portion 96 through a flow path, which is formed by the communication portion 94 and the hole 92.

When an inflator for inflating the curtain airbag 30L is activated, gas is supplied into the curtain airbag 30L. Because the delayed inflation portion 96 has the narrow gas flow path, a velocity of gas which is flowed therein is slow, and thus at an initial stage of inflation of the curtain airbag 30L, the delayed inflation portion 96 is scarcely inflated. Also, because the panels 31 and 32 are sewn to each other by the seat at the periphery of the hole 92, a recess portion is formed on the vicinity of the hole 92 of the curtain airbag 30L at the initial stage of inflation. The recess portion receives the left side portion of the driver seat airbag 9, so that when the vicinity of the left side portion of the driver seat airbag 9 receives a head of a passenger, the driver seat airbag 9 can be inhibited from being retracted a direction toward the A-pillar.

Then, gas is flowed into the delayed inflation portion 96 through the communication portion 94 and the hole 92 so that the delayed inflation portion 96 is inflated. Then, the delayed inflation portion 96 inflated is strongly contacted with the driver seat airbag 9. Accordingly, a configuration for preventing the head of the passenger from entering a gap between the curtain airbag 30L and the drive seat airbag 9 can be simply realized.

The foregoing embodiments are examples of the present invention, and thus the invention may be embodied in forms other than those shown. For example, although in the foregoing embodiments, the curtain airbag 10 is configured so that a thickness thereof at a location which is located more toward the vehicle rear side than the first inflation portion 11 is thinner than a thickness at a location which is located in the vicinity of the first inflation portion 11, thicknesses at both may be the same.

What is claimed is:

1. A passenger retaining apparatus comprising:
   a driver seat airbag; and
   a curtain airbag that expands toward a side of a passenger;
   wherein the curtain airbag includes:
   a first inflation portion that is inflated at a passenger side with respect to the driver seat airbag in a vehicle body longitudinal direction;
   a second inflation portion that is inflated at a wind shield side with respect to the driver seat airbag in the vehicle body longitudinal direction; and
   a recess portion that is formed between the first inflation portion and the second inflation portion and that is configured to engage with the driver seat airbag;
   wherein, upon a slight lap crash or an oblique crash of a vehicle, the driver seat airbag is configured for retaining a front surface of a head of the passenger and the first inflation portion is configured for retaining a side surface of the head of the passenger,
   wherein the curtain airbag further includes:
   a shallowing unit that shallows a depth of the recess portion after starting inflations of the first inflation portion and the second inflation portion.

2. The passenger retaining apparatus according to claim 1, wherein a distance between a most passenger-side surface of the first inflation portion of the inflated curtain airbag and a center axis of a steering shaft is within a range of 80 mm to 230 mm, in a vehicle body width direction.

3. The passenger retaining apparatus according to claim 1, wherein a distance between a most door-side end portion of the driver seat airbag and a most passenger-side surface of the second inflation portion of the inflated curtain airbag is within a range of 25 mm to 150 mm, in a vehicle body width direction.

4. The passenger retaining apparatus according to claim 1, wherein the shallowing unit is an inflation portion which is configured to be inflated in a vehicle interior side of the recess portion.

5. The passenger retaining apparatus according to claim 4, wherein the inflation portion is connected to a lower side of a main body portion of the curtain airbag and is folded at the lower side of the main body portion to a vehicle interior side of the main body portion.

6. The passenger retaining apparatus according to claim 4, wherein the inflation portion includes:
   a hole that is formed on a panel of a vehicle interior side of the curtain airbag;
   a small panel that covers the hole; and
   a seam that sews a peripheral edge of the small panel to the panel of the vehicle interior side of the curtain airbag.

7. The passenger retaining apparatus according to claim 1, wherein the shallowing unit includes:
   a tether that extends in the vehicle body longitudinal direction on a vehicle exterior side of the curtain airbag across a forming region of the recess portion;
   a front seam that sews a front end portion of the tether to a panel of the curtain airbag; and
   a rear seam that sews a rear end portion of the tether to the panel of the curtain airbag;
   wherein a length of the tether between the front seam and the rear seam is smaller than a length of the panel of the curtain airbag between the front seam and the rear seam.

* * * * *